(12) United States Patent
Santiano et al.

(10) Patent No.: US 10,647,302 B2
(45) Date of Patent: May 12, 2020

(54) SETTING VEHICLE PERMISSIONS USING GEO-FENCING

(71) Applicant: Faraday & Future Inc., Gardena, CA (US)

(72) Inventors: Julie Ann Santiano, Los Angeles, CA (US); Chris Wang, Los Angeles, CA (US); Misia K. Clive Groszek, Los Angeles, CA (US); Skyler Reed Lund, La Crescenta, CA (US)

(73) Assignee: FARADAY & FUTRUE INC., Gardena, CA (US)

(*) Notice: Subject to any disclaimer, the term of this patent is extended or adjusted under 35 U.S.C. 154(b) by 0 days.

(21) Appl. No.: 15/785,338

(22) Filed: Oct. 16, 2017

(65) Prior Publication Data

US 2019/0193682 A1 Jun. 27, 2019

Related U.S. Application Data

(60) Provisional application No. 62/409,354, filed on Oct. 17, 2016.

(51) Int. Cl.
*G08G 1/00* (2006.01)
*B60R 25/33* (2013.01)
*H04W 4/021* (2018.01)

(52) U.S. Cl.
CPC ............ *B60R 25/33* (2013.01); *G08G 1/207* (2013.01); *H04W 4/022* (2013.01)

(58) Field of Classification Search
CPC ........ B60R 25/33; G08G 1/207; H04W 4/022
USPC .......................................................... 340/990
See application file for complete search history.

(56) References Cited

U.S. PATENT DOCUMENTS

| 5,532,690 | A  | * | 7/1996  | Hertel   | B60R 25/04   |
|-----------|----|---|---------|----------|--------------|
|           |    |   |         |          | 340/989      |
| 6,943,701 | B2 | * | 9/2005  | Zeineh   | G01C 21/26   |
|           |    |   |         |          | 340/988      |
| 7,286,929 | B2 | * | 10/2007 | Staton   | B60R 25/33   |
|           |    |   |         |          | 340/990      |
| 9,535,586 | B2 | * | 1/2017  | Johnson  | G08G 1/207   |
| 10,066,952| B2 | * | 9/2018  | Park     | G01C 21/3697 |

* cited by examiner

*Primary Examiner* — John A Tweel, Jr.

(57) ABSTRACT

A system for controlling vehicle permissions based on a geo-fence boundary is disclosed. The system may include one or more processor that receives location information of an origin, generates a map based on the location information of the origin, determines the geo-fence boundary associated with a prospective radius from the origin based on the map, receives a vehicle location, and controls the vehicle permissions based on a comparison of the vehicle location to the geo-fence boundary. The system may further include a display configured to display the map and the geo-fence boundary.

14 Claims, 7 Drawing Sheets

SETTING VEHICLE PERMISSIONS USING GEO-FENCING

CROSS-REFERENCE TO RELATED APPLICATIONS

This application claims the benefit of U.S. Provisional Application No. 62/409,354, filed Oct. 17, 2016, the entirety of which is hereby incorporated by reference.

TECHNICAL FIELD

The present disclosure generally relates to systems and methods for allowing a vehicle owner to control vehicle permissions in an intuitive and user-friendly manner, and more specifically, to setting vehicle permissions using a map and a geo-fence boundary.

BACKGROUND

A vehicle owner may wish to lend his or her vehicle for use. While a vehicle owner may wish to grant permission for another person to drive the vehicle, he or she may wish to restrict the distance and/or area that the vehicle can be operated within.

However, restricting the distance and/or area that the vehicle can be operated within may be difficult to implement. For example, unless a driver follows instructions provided by the vehicle owner, the vehicle owner may not be able to control or determine whether the driver operated the vehicle within a set distance and/or area. In particular, without remote control or oversight of vehicle operations, a vehicle driver may drive outside a restricted distance and/or area without the owner even noticing.

Moreover, where remote control or oversight of vehicle operations exists, a vehicle owner may lack an intuitive and user-friendly technique to control and set boundaries to restrict the distance and/or area that the vehicle can be operated within. For example, existing network-based software applications used to control vehicle operations may not include a mechanism to set and update boundary restrictions based on owner interaction, and may be time-consuming or burdensome. Furthermore, existing network-based software applications may not provide a simple way to generate or modify a geographic boundary to control vehicle permissions in real-time. Therefore, there is a need for an improved system and method for setting and updating geographic vehicle restrictions.

SUMMARY

One aspect of the present disclosure is directed to a system for controlling vehicle permissions based on a geo-fence boundary. The system may include one or more processors. The one or more processors may receive location information of an origin, generate a map based on the location information of the origin, determine the geo-fence boundary associated with a prospective radius from the origin based on the map, receive a vehicle location, and control the vehicle permissions based on a comparison of the vehicle location to the geo-fence boundary. The system may also include a display configured to display the map and the geo-fence boundary.

One aspect of the present disclosure is directed to a method for controlling vehicle permissions based on a geo-fence boundary. The method may be performed by one or more processors. The method may include receiving location information of an origin, generating a map based on the location information of the origin, determining the geo-fence boundary associated with a prospective radius from the origin based on the map, receiving a vehicle location, controlling the vehicle permissions based on a comparison of the vehicle location to the geo-fence boundary, and displaying the map and the geo-fence boundary.

Yet another aspect of the present disclosure is directed to a non-transitory computer-readable medium. The non-transitory computer-readable medium may store instructions executable by one or more processors to perform a method. The method may include receiving location information of an origin, generating a map based on the location information of the origin, determining the geo-fence boundary associated with a prospective radius from the origin based on the map, receiving a vehicle location, controlling the vehicle permissions based on a comparison of the vehicle location to the geo-fence boundary, and displaying the map and the geo-fence boundary.

DETAILED DESCRIPTION

Figure 1:
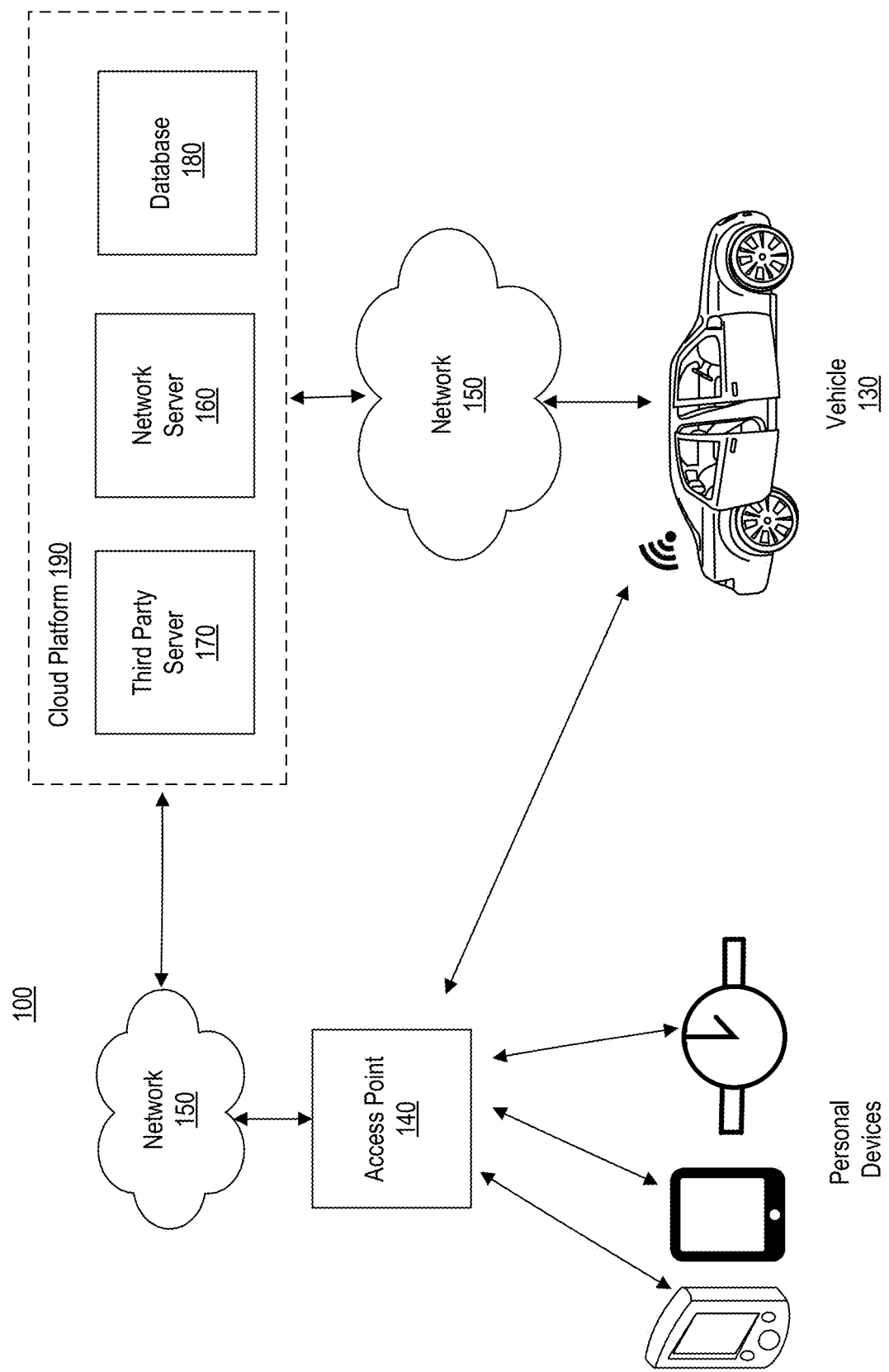
FIG. 1 is a schematic block diagram illustrating an exemplary system for controlling vehicle permissions based on a geo-fence boundary, in accordance with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

FIG. 1 is a schematic block diagram illustrating an exemplary system 100 for controlling vehicle permissions based on a geo-fence boundary, in accordance with the disclosed embodiments. As illustrated in FIG. 1, system 100 may include one or more personal devices 120, vehicle 130, and network 150.

Personal devices 120 may include personal computing devices such as, for example, desktop computers, notebook computers, mobile devices, tablets, smartphones, wearable devices such as smart watch, smart bracelet, and Google Glass™, and any other personal devices. Personal devices 120 may communicate with other parts of system 100 through network 150. Personal devices 120 may also include software and executable programs and/or applications configured to operate with network server 160 to control vehicle permission settings for vehicle 130. Other software and executable programs are contemplated.

Vehicle 130 may have any body style, such as a sports car, a coupe, a sedan, a pick-up truck, a station wagon, a sports utility vehicle (SUV), a minivan, or a conversion van. Vehicle 130 may be an electric vehicle, a fuel cell vehicle, a hybrid vehicle, or a conventional internal combustion engine vehicle. Vehicle 130 may be configured to be operated by an authorized driver and/or remotely controlled by a vehicle owner communicating with network server 160 by operating a software application executed on a personal device 120. Vehicle 130 may be remotely or autonomously controlled via advanced driver assistance systems (ADAS) and network server 150 and/or remotely controlled and monitored in a cloud environment.

System 100 may allow for one or more personal devices 120 to transfer vehicle permission information, including map and geo-fence boundary information associated with a software application (e.g., referenced in FIGS. 4-6), over network 150 to cloud platform 190 and/or vehicle 130. System 100 may include mobile or stationary (not shown) personal devices 120 located in residential premises and non-residential premises configured to communicate with network 150. Personal devices 120 may connect to network 150 by Wi-Fi or wireless access points (WAP). Bluetooth® or similar wireless technology may be contemplated. Network 150 may include a wireless network, such as a cellular network, a satellite network, the Internet, or a combination of these (or other) networks that are used to transport data. Furthermore, network 150 may be a wired network, such as an Ethernet network. Network 150 may transmit, for example, authentication services that enable personal devices 120 to access information, including identification data, registered user data. Network 150 may further transmit vehicle permission data, such as origin data, perimeter data, radius data, map data, vehicle location data, geo-fence boundary data, and date/time usage data. Network 150 may also transmit data corresponding to drawing, tracing, tapping, painting, and clicking user input provided to a software application on a personal device 120. Other accessible data is contemplated.

In exemplary system 100, personal devices 120 and vehicle 130 may communicate with one or more servers in cloud platform 190 through network 150. Cloud platform 190 may comprise one or more network servers 160, third party servers 170, and/or databases 180. Servers 160 and 170 may provide cloud services for users and their personal devices 120. For example, a cloud-based architecture may be implemented comprising a distributed portion that executes at another location in network 150 and a corresponding cloud portion that executes on a network server 160 in cloud platform 190. Servers in cloud platform 190 may also communicate with a receiver (as further referenced in FIG. 3) of vehicle 130 over network 150 using appropriate cloud-based communication protocols, such as SOAP or REST and/or other protocols that would be known to those skilled in the art. Such communication may allow for remote control of vehicle 130 operations and permissions by, for example, a vehicle owner operating software or application executed on a personal device 120 configured to operate with network server 160.

As shown in FIG. 1, network 150 may be accessible to network servers 160, third party servers 170, and databases 180 in cloud platform 190, for sending and receiving of information, such as registered user information, vehicle location data, map data, geo-fence boundary information, and vehicle permission information, within system 100. Network server 160, third party server 170, and database 180 may include network, cloud, and/or backup services. For example, in some embodiments, network server 160 may include a cloud computing service such as Microsoft Azure™ or Amazon Web Services™. Additional cloud-based wireless access solutions compatible with LTE (e.g., using the 3.5 GHz spectrum in the US) are contemplated. In some embodiments, third party server 170 may include a messaging or notification service, for example, that may notify a user of updates or changes to a vehicle location, and corresponding updates and changes to map data, geo-fence boundary information, and vehicle permission information (further described with reference to FIGS. 3-7).

Figure 2:
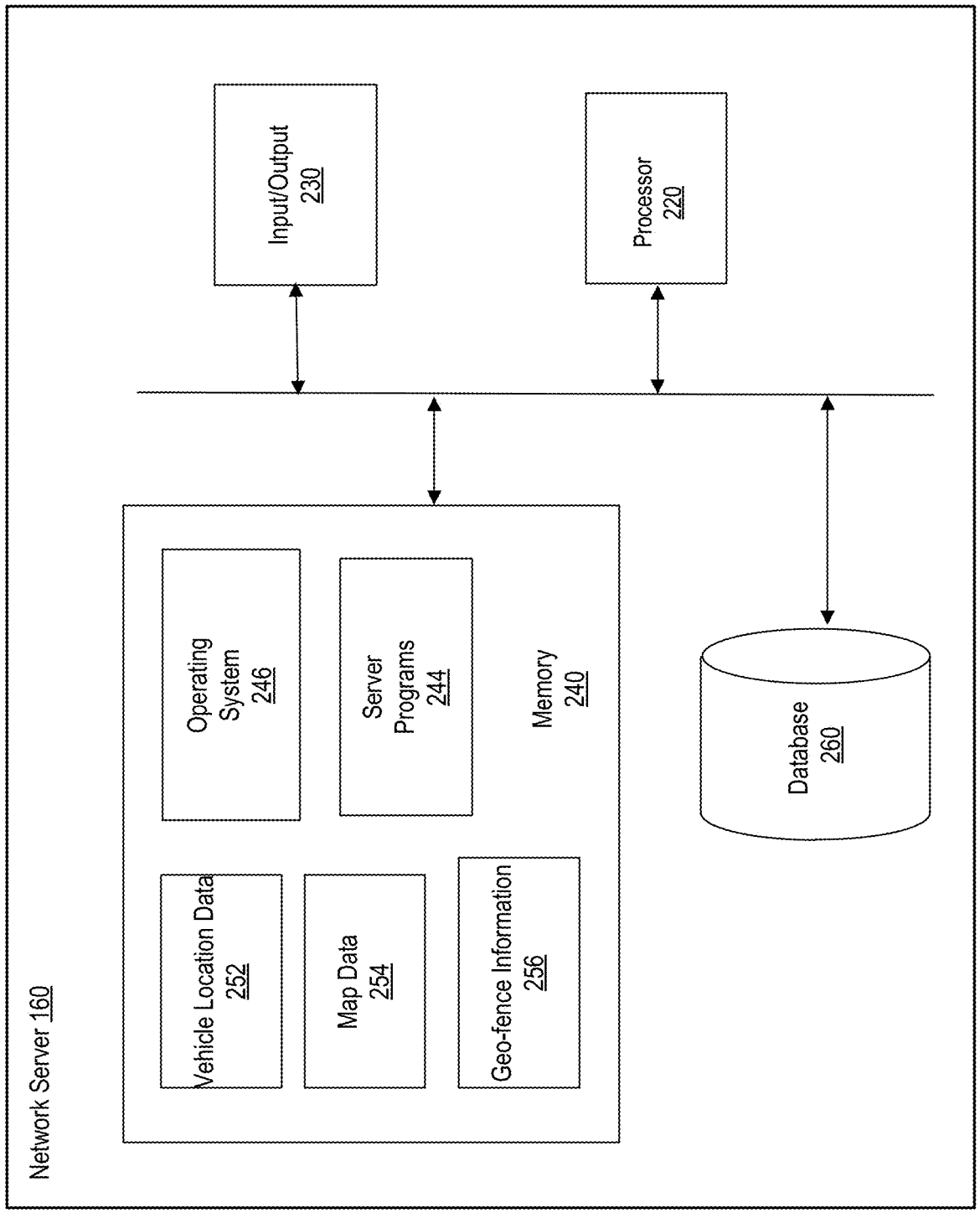
FIG. 2 is a schematic block diagram illustrating an exemplary network server, used in the exemplary system of FIG. 1.

FIG. 2 is a schematic block diagram 200 of an exemplary embodiment of a network server 160 that may be used in exemplary system 100 of FIG. 1. It is contemplated that one or more personal device 120 may include similar structures described in connection with network server 160. As shown in FIG. 2, network server 160 may include, among other things, a processor 220, personal/output (I/O) devices 230, memory 240, and a database 260, each coupled to one or more interconnected internal buses (not shown). Memory 240 may store, among other things, server programs 244 and an operating system 246. Server programs 244 may be executed by a cloud-based architecture or, alternatively, by network server 160. In alternative embodiments, software program 244 may be executed in personal devices 120 or in a vehicle controller (described with reference to FIG. 3), and configured to operate with network server 160 to implement control of vehicle operations according to captured vehicle location data, map data, geo-fence boundary information, vehicle permission data, and/or registered user affiliated data.

Memory 240 and/or database 260 may store vehicle location data 252 based on individual and/or aggregate vehicle behavior. For example, GPS navigational data and associated routing graphs may correspond to one or more registered users, and may be stored with an associated timestamp and user identifier. Alphanumeric identifiers may be used to identify one or more registered users and to parse memory 240 and/or database 260 for origin or vehicle location data 252. Vehicle location data 252 may include GPS data, captured landmark data, and/or user input location information including, for example, address information or a business name. Memory 240 and/or database 260 may store vehicle location data 252. Memory 240 and/or database 260 may similarly store map data 254 and geo-fence boundary information 256, and may further store other software programs, data, and metadata. Map data 254 may be generated around an origin based on a current vehicle location data 252. Geo-fence boundary information 256 may include information describing a geo-fence boundary (further described with reference to FIG. 4-7) associated with particular map data 254, registered users, and associated user profiles.

Database 260 may include Microsoft SQL databases, SharePoint databases, Oracle™ databases, Sybase™ databases, or other relational databases. Memory 240 and database 260 may be implemented using any volatile or non-volatile memory including, for example, magnetic, semiconductor, tape, optical, removable, non-removable, or any other types of storage devices or computer-readable mediums.

I/O interfaces 230 may include not only network interface devices, but also user interface devices, such as one or more keyboards, mouse devices, and graphical user interfaces (GUIs) being used with personal devices 120. GUIs (as further described with reference to FIGS. 4-6) may operate as part of a software application setting vehicle permissions according to geo-fence boundaries. The software application may be configured to connect to and communicate network server 160. GUIs may include a screen displaying a generated map and allowing for user input or interaction including drawing, tracing, tapping, painting, clicking, snapping, zooming-in, zooming-out, and other user interactions as contemplated with a GUI map. For example, GUIs may include a touch screen where a user may use his fingers to provide input, or a screen that can detect the operation of a stylus.

Network server 160 may receive vehicle location data 252, map data 254, and geo-fence information 256 from network 150 through I/O device 230, and analyze such data to control and/or restrict vehicle 130 operations. Network server 160 may determine vehicle permission data based on a comparison of current vehicle location data 252 to one or more geo-fence boundaries according to stored or real-time transmitted geo-fence information 256, and may send instructions to modify, disable, or expand vehicle 130 permissions and/or operations across network 150. Network server 160 may store a copy of vehicle location data 252, map data 254, and geo-fence boundary information 256. Network server 160 may also store a copy of vehicle owner and other authorized user information, and may save vehicle permission instructions, for example, in memory 240, database 260, database 280, or in any other database accessible by network server 160.

Figure 3:
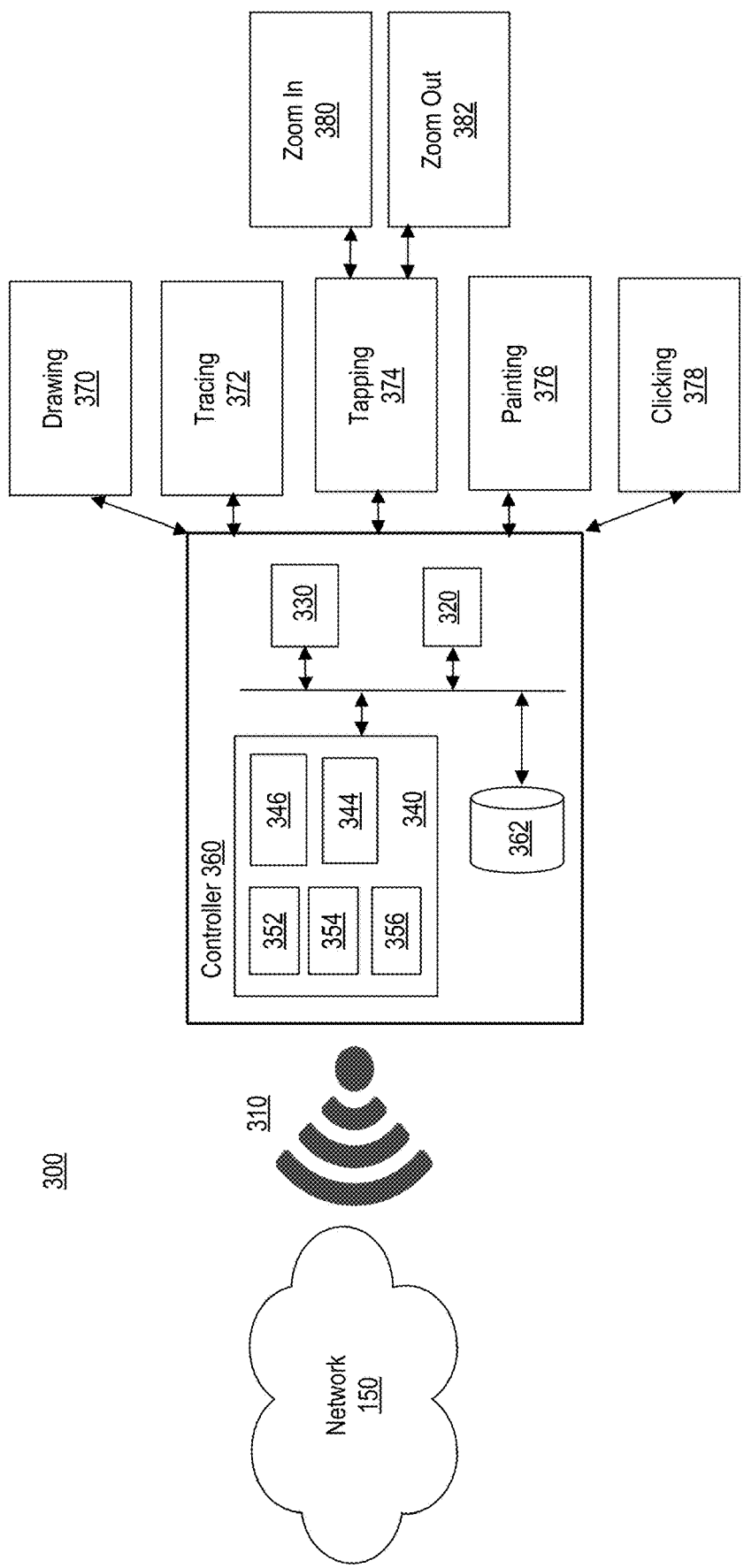
FIG. 3 is a schematic block diagram illustrating an exemplary vehicle controller, used in the exemplary system of FIG. 1.

FIG. 3 is a schematic block diagram 300 illustrating an exemplary vehicle controller 360 configured to implement system 100 of FIG. 1. As illustrated in FIG. 3, vehicle 130 may include a vehicle controller 360 capable of communicating with a transceiver 310, network 150, and ultimately one or more personal devices 120 associated with a software application operated by a vehicle owner. Transceiver 310 may be capable of receiving one or more vehicle permission instructions (further described with reference to FIG. 4) from one or more personal devices 120 and/or cloud platform 190 over network 150. Transceiver 310 may be capable of transmitting vehicle location data 352 from vehicle 130 to one or more personal devices 120 and/or cloud platform 190 over network 150. Controller 360 may generate new map data 354 according to new vehicle location data 352 and transmit vehicle location data 352, map data 354, and geo-fence information 356 that is updated based on generated new map. This data may be stored in memory 340 or database 362. Controller 360 may include one or more processors 320, input/output 330, controller programs 344 and operating system 346. Controller 360 may function in a manner similar to network server 160 and may operate independently or cooperatively with network server 160. Controller 360 may be configured to receive vehicle owner instructions to control and/or restrict the distance and/or area that the vehicle can be operated within. A vehicle owner may perform operations on a personal device 120 including drawing 370, tracing 372, tapping 374, painting 376, and clicking 378 in a software application GUI in order to create a geo-fence boundary. Tapping 374 may further include zooming-in 380 and zooming-out 382 of the map in order to generate geo-fence boundaries of different sizes. Controller 360 may communicate an updated geo-fence boundary size to one or more processors 320 to compare with vehicle location data 352, and may determine any adjustments in vehicle permissions or vehicle operations. For example, if it is determined that vehicle 130 is no longer inside a geo-fence boundary, vehicle 130 may have operations disabled including for example, driving, entertainment, and/or locking or unlocking.

Figure 4:
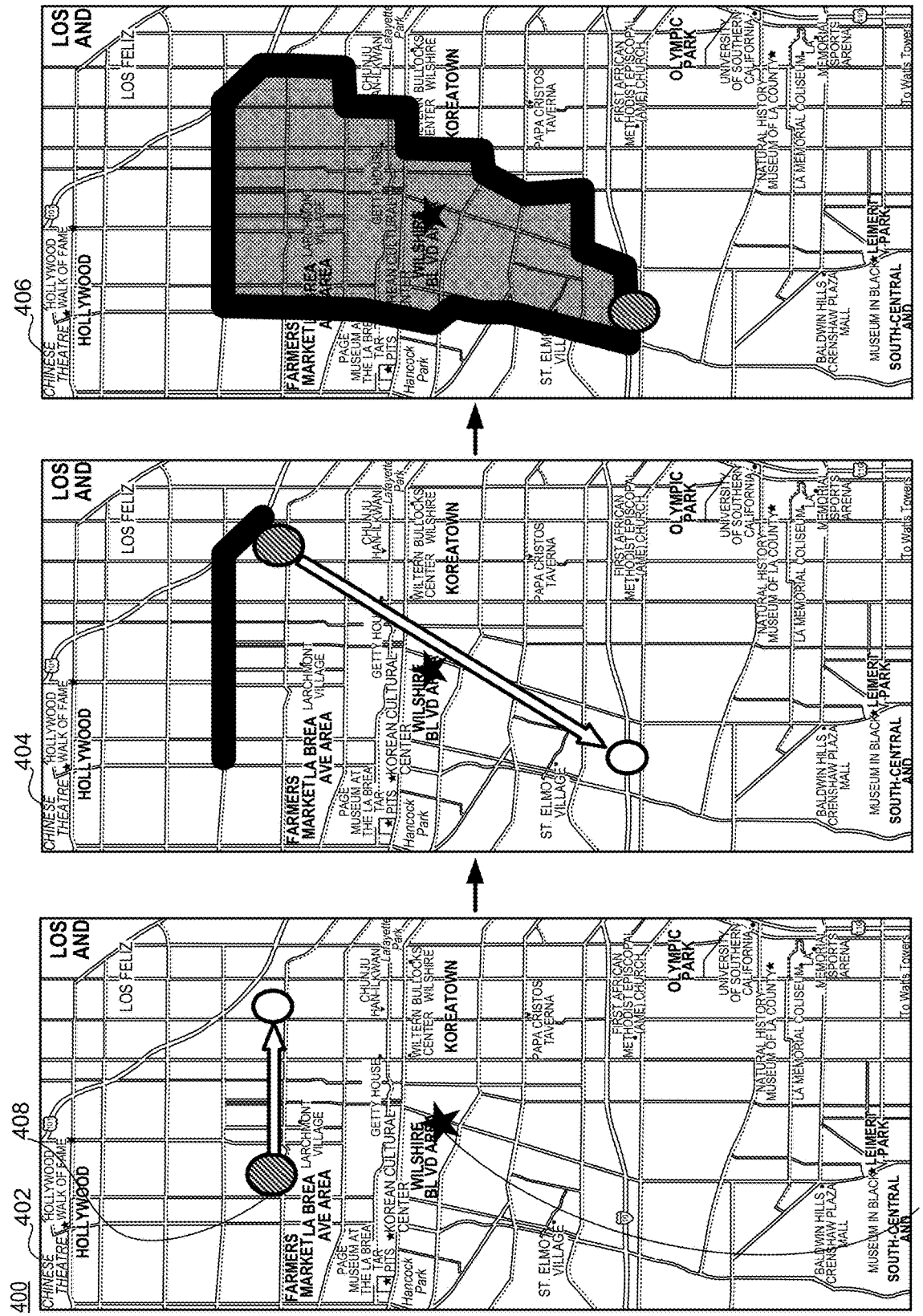
FIG. 4 is a diagrammatic illustration of a first embodiment of setting a geo-fence boundary on an exemplary map.

FIG. 4 is a diagrammatic illustration 400 of a first geo-fence boundary displayed on an exemplary map generated by the exemplary system of FIG. 1. In particular, FIG. 4 is a diagrammatic illustration of a vehicle owner tracing a geo-fence boundary over an exemplary map generated by the exemplary system of FIG. 1. The exemplary map, as illustrated, is a map of a portion of downtown Los Angeles, Calif. The map may be generated based on an origin, e.g., a vehicle current location, home, office, landmark or another point of interest. For example, the star in FIG. 4 indicates the origin, which is near the Wilshire Blvd area. Map data associated with the origin may be retrieved and a map of areas surrounding the origin may be generated and displayed on personal device 120.

FIG. 4 illustrates three distinct stages of a vehicle owner tracing a geo-fence boundary over the displayed map. A shaded circle indicates an initial user touch point where a vehicle owner/user touches a screen of a personal device 120. For example, the user touch point may be created by the user's finger or a screen touching tool, such as a stylus. An arrow represents a tracing direction by a vehicle owner/user, and an empty circle indicates a tracing end point for a geo-fence boundary segment.

In a first stage 402, a vehicle owner/user touches the GUI at a small touch point 408. The vehicle owner/user then traces over to an empty circle at which point a first boundary segment portion is shown on top of a latitudinally or horizontally extending road in the second stage 404. Once drawn (e.g., user touch point released from the screen), the boundary may be shown in a certain format, to distinguish from existing lines in the map. For example, FIG. 4 shows the drawn portion of the boundary by a thick solid line, but other boundary indicators are contemplated. Subsequently, the vehicle owner/user next traces the shaded circle to a second empty circle as shown in stage 404, and a second boundary segment portion is shown as a thick solid line in the third stage 406. Although the trajectory traced is a diagonal line, it may snap to conform with existing lines in the map. For example, as shown in the third stage 406, the second boundary segment portion snaps at the shaded circle to conform with a boundary defined by a boundary of available roads. Rather than creating a second boundary segment portion traversing or crossing over and through roads, personal device 120 may communicate with network server 160 and database 180 to generate a second boundary segment portion that automatically conforms thick solid boundary lines to available roads. The available road information may also be stored as part of map data 254. After the vehicle owner/user creates two boundary segment portions, processor 220 may close the geo-fence using geo-fence information 256 by automatically creating a third boundary portion segment connecting the first and second boundary segment portions, and also conforming with a boundary defined by existing thick lines (e.g., available roads) in the map using map data 254. Other methods of tracing a geo-fence path are contemplated. Additionally, other geo-fence boundary shapes, snap levels, and segment transitions may be contemplated, and may or may not conform with roads and other landmarks according to vehicle location data 252. In particular, the snap level may accord to a zoom level of the map. For example, in a "zoomed in" view, the boundary may snap to smaller roads, while in a "zoomed out" view, the boundary may snap to major roads, such as multi-lane roads and highways. Segment transitions may also be indicated by the user. For example, an end of a boundary segment portion may be indicated by a sharp change in direction (as shown in FIG. 4), and may also be indicated by a pause allowing for a more gradual change in direction.

Figure 5:
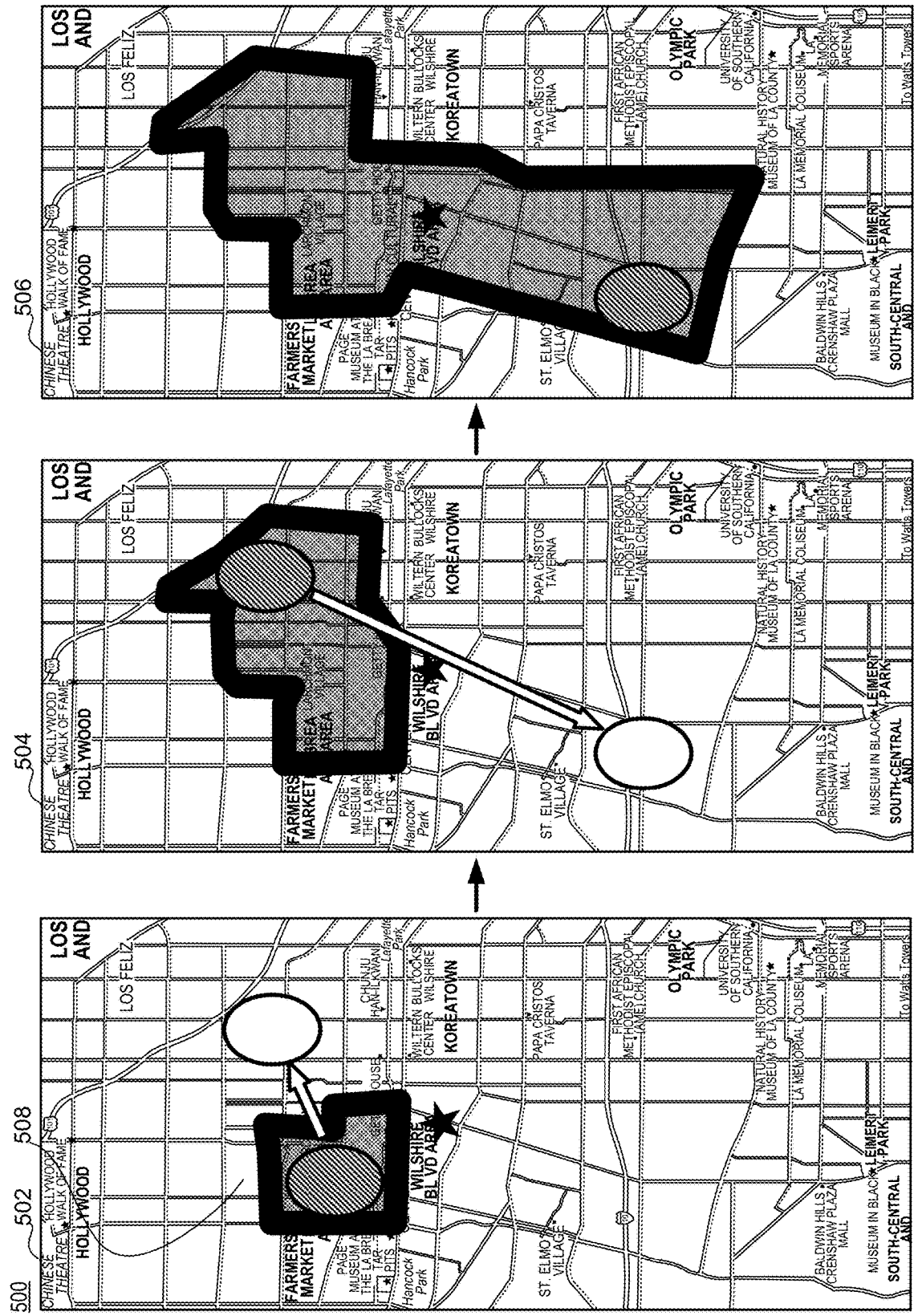
FIG. 5 is a diagrammatic illustration of a second embodiment of setting a geo-fence boundary on an exemplary map.

FIG. 5 is a diagrammatic illustration 500 of a second geo-fence boundary displayed on an exemplary map generated by the exemplary system of FIG. 1. In particular, FIG. 5 is a diagrammatic illustration of painting an authorized area over an exemplary map generated by the exemplary system of FIG. 1 in order to create a geo-fence boundary. In the illustration, the exemplary map, as illustrated, is again a map of a portion of downtown Los Angeles, Calif. FIG. 5 also illustrates three distinct stages of a vehicle owner/user painting with a finger an authorized area on a GUI to establish a geo-fence boundary according to geo-fence information 256. In the first stage 502, at a larger shaded circle at touch point 508 (representative of, for example, a larger fingerprint or stylus), a vehicle owner/user touches the GUI. The vehicle owner/user then paints in the direction of the arrow over to the empty circle at first stage 502 at which point a first authorized area is shown on top of the roads in the second stage 504. Subsequently, the vehicle owner/user paints to the empty circle as shown in stage 504, resulting in a second authorized area portion shown in stage 506. As shown in first stage 502, second stage 504, and third stage 506, the boundaries of the painted authorized area shown constitute thick solid lines and conform with the boundaries created by the available roads based on map 254 and memory 240 to create, by one or more processors 220, a geo-fence boundary according to geo-fence information 256 used to regulate, by network server 160, vehicle permissions. Other methods of painting an authorized area to create a geo-fence boundary are contemplated. The boundary of a painted area may also accord to a zoom level of the map. For example, in a "zoomed in" view, the boundary may conform with smaller roads, while in a "zoomed out" view, the boundary may conform with major roads. Segment transitions may also be indicated by the user. For example, a pause may indicate the end of painting.

Figure 6:
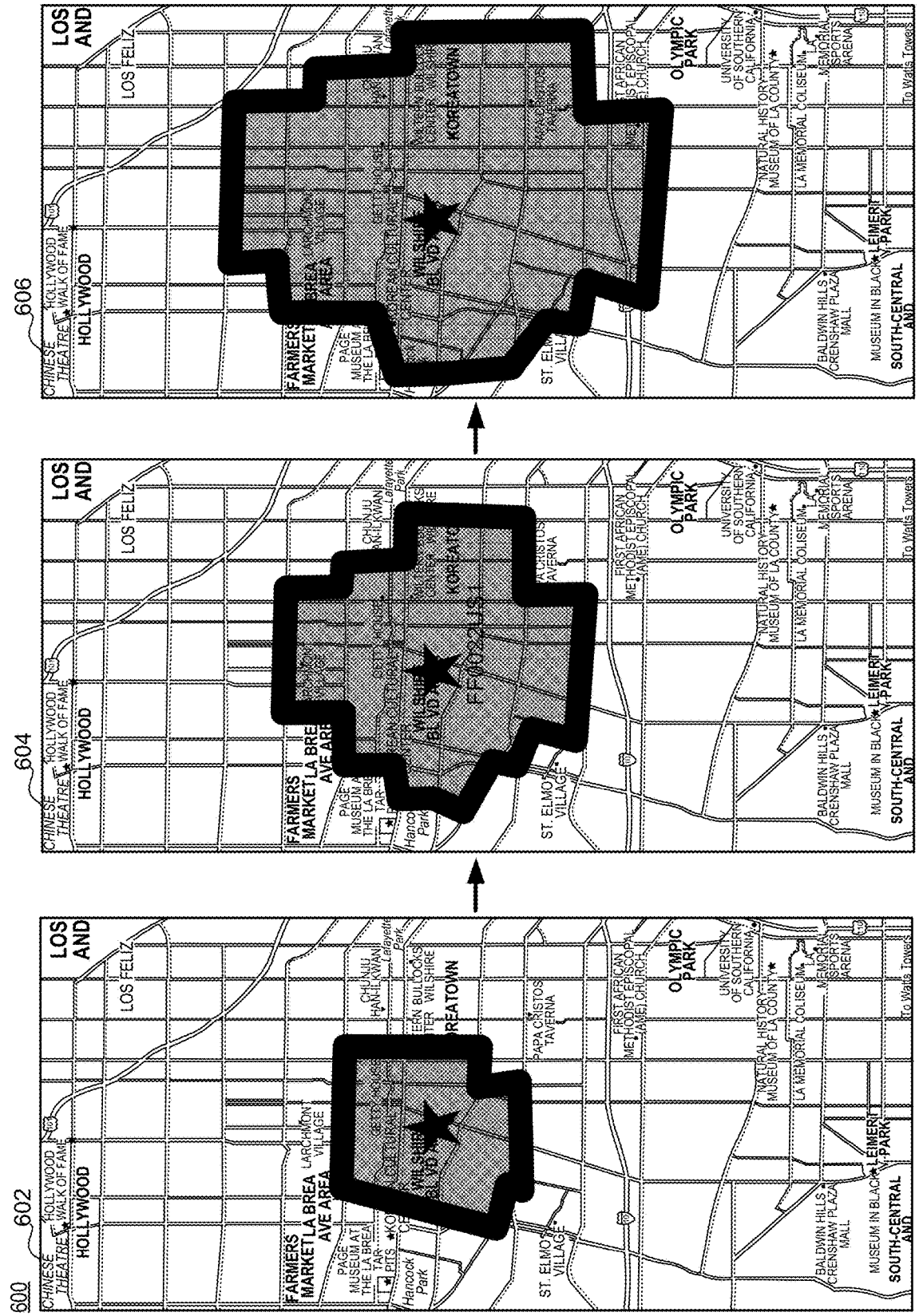
FIG. 6 is a diagrammatic illustration of a third embodiment of setting a geo-fence boundary on an exemplary map.

FIG. 6 is a diagrammatic illustration 600 of a third geo-fence boundary displayed on an exemplary map generated by the exemplary system of FIG. 1. In particular, FIG. 6 is a diagrammatic illustration of expanding a prospective radius or perimeter of a geo-fence boundary over an exemplary map generated by the exemplary system of FIG. 1. In the illustration, the exemplary map is also a map of downtown Los Angeles, Calif. FIG. 6 illustrates three distinct stages of a vehicle owner/user clicking or tapping to expand a radius or perimeter of a geo-fence boundary according to geo-fence information 256 for downtown Los Angeles, Calif. on a GUI. In the first stage 602, upon a single click or a tap by the vehicle owner/user of the GUI, one or more processors 220 may expand the geo-fence boundary to a first pre-determined perimeter or radius surrounding an origin. In some embodiments, the boundary may snap to conform to roads directly surrounding the origin (represented by a star) or location corresponding to a determined vehicle location data 252. When the vehicle owner/user taps or clicks the GUI twice, the geo-fence boundary may be expanded to a larger perimeter or radius as shown in stage 604, and according to geo-fence information 256. When the vehicle owner/user taps or clicks the GUI a third time, the geo-fence boundary may be further expanded to an even larger perimeter or radius as shown in stage 606. At each stage, the boundary may snap to conform thick solid lines to existing roads according to map data 254. Other methods of expanding a geo-fence perimeter or radius are contemplated. For example, drawing, tracing, tapping, painting, clicking, zooming-in, and zooming-out can be used to generate a geo-fence boundary. In particular, the boundary of an expanded zone may accord to a zoom level of the map. For example, a "zoomed in" view may allow for generation and display of a geo-fence boundary of smaller roads, and a "zoomed out" view may allow for generation and display of a geo-fence boundary of major roads.

Figure 7:
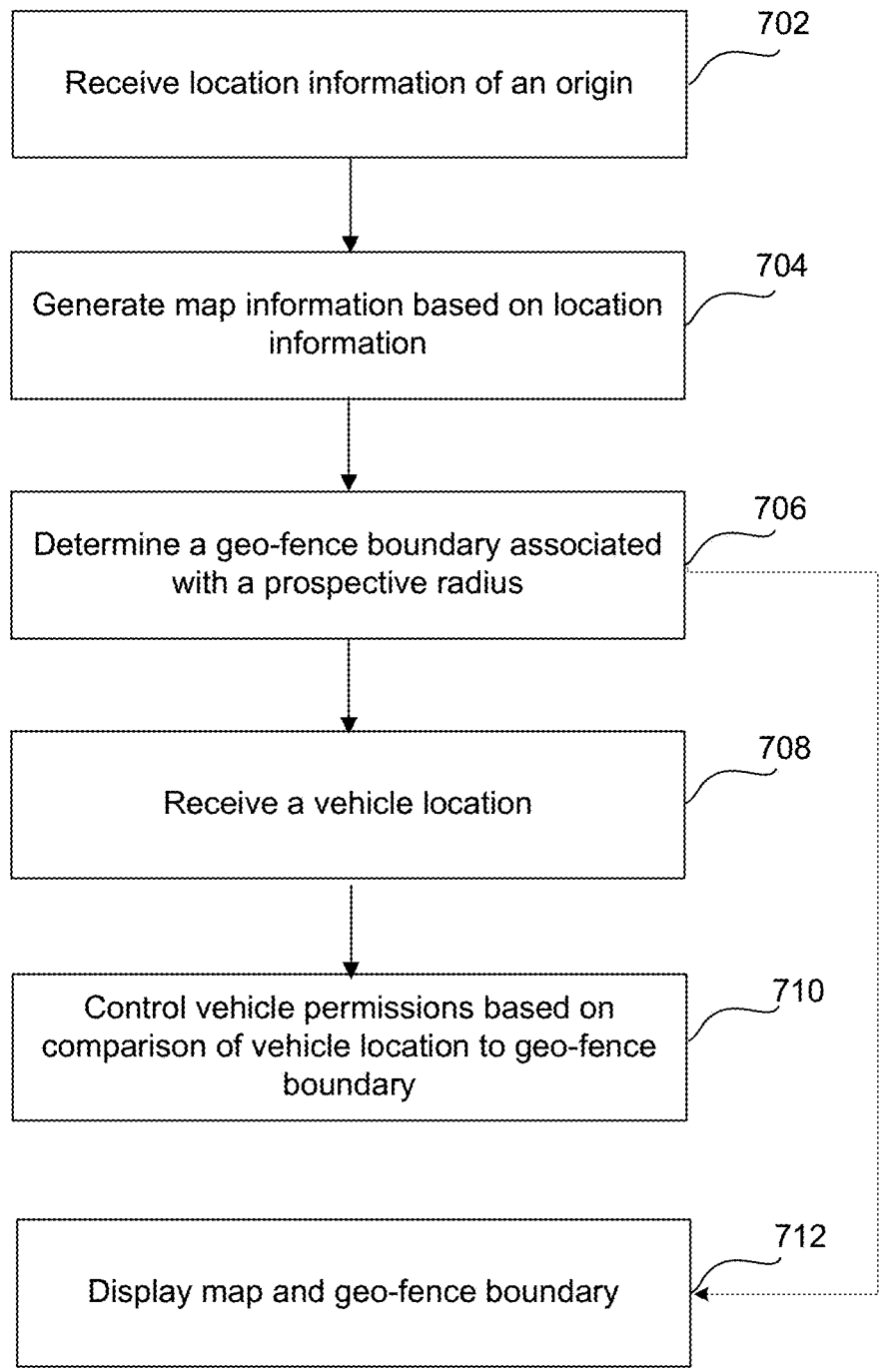
FIG. 7 is a flow chart illustrating an exemplary process performed by the exemplary system in FIG. 1 in accordance with the disclosed embodiments.

FIG. 7 is a flow chart illustrating an exemplary process 700 that one or more processors may perform in accordance with the disclosed embodiments. While the exemplary process 700 is described herein as a series of steps, it is to be understood that the order of the steps may vary in other implementations. In particular, steps may be performed in any order, or in parallel. The one or more processors may include processors in network server 160, processors in personal device 120, and/or processors in vehicle controller 360. In other words, each step of process 700 may be performed by network server 160, personal device 120, or alternatively, by vehicle controller 360, or any combination thereof. For example, some steps of process 700 may be performed by one processor while some other steps may be performed by another processor. Furthermore, while the exemplary process 700 is described with respect to controlling vehicle permissions based on a geo-fence boundary set at a personal device 120, geo-fence boundary information may also be drawn at a user panel in vehicle 130 executing a corresponding software application configured to operate with network server 160.

At step 702, process 700 may include receiving location information of an origin. The location information of an origin may be based on current vehicle location data 352 according to, for example, GPS navigation data or other transmissions from vehicle 130 indicating a current location. The origin may also be the vehicle user's home or office, or another point of interest. The location of the origin may also include a landmark feature. For example, a landmark feature may include at least one of streets, city boundaries, county boundaries, or state boundaries. Controller 360 may transmit vehicle location data 352 or landmark feature data indicative of an origin. The origin may also be a location stored in memory 240 or database 260. The origin may remain visible on a GUI as a map is zoomed out. The origin may be located at the center of the GUI. Other origin sources and display positions are contemplated.

At step 704, process 700 may include generating map information based on location information of the origin. Network server 160 may generate a map according to vehicle location data 252. Similarly, map information may be pulled from stored map data 254 and presented to a vehicle owner/user to conform with the GUI size requirements of a screen of a personal device 120. The map may be zoomed-in or out, rotated about the origin, and map information may be continuously updated in order to present a current map in a GUI to a vehicle owner/user executing a software application in order to control vehicle permissions. As vehicle 130 travels, map information may continuously update to display new areas surrounding a new vehicle location 252. One or more geo-fence boundaries (described in step 706) according to captured geo-fence information 256 may also be displayed on the same map, and may be shared with one or more vehicle owners. Other map information and map capabilities are contemplated.

At step 706, process 700 may include determining a geo-fence boundary associated with a prospective radius or perimeter. A geo-fence boundary may be determined based on a prospective radius generated from the origin based on map information 254 and geo-fence information 256. Moreover, one or more processors 220 may automatically determine a geo-fence boundary according to a predetermined radius from the origin. The geo-fence information 256 may also be provided by user input drawing a boundary, painting a shape on a generated map around the origin, or clicking or tapping the area around the origin (as described and illustrated with reference to FIGS. 4-6), and one or more processors 220 may be configured to determine a geo-fence boundary according to landmark features in the map. The landmark features may include at least one of streets, city boundaries, county boundaries, or state boundaries. One or more processors 220 may detect first and second user interactions (e.g., clicks or taps on the GUI), determine first and second geo-fence boundaries around the origin based on first and second user interactions. The second geo-fence boundary may embrace the first geo-fence boundary. More than two user interactions and more than two geo-fence boundaries are contemplated. Drawing, tracing, tapping, painting, clicking, zooming-in, and zooming-out may be detected as user inputs to generate a geo-fence boundary associated with a prospective radius. Other detected user inputs are contemplated.

At step 708, process 700 may include receiving a vehicle location. Vehicle location data 352 may be received according to, for example, GPS navigation, satellite, or other transmissions from vehicle 130 indicating its current location. Controller 360 may transmit vehicle location data 352 through transceiver 310 to personal device 120. Vehicle location data may be captured by cameras or other electronic sensors associated with vehicle 130. Vehicle location data 352 may also include associated metadata including basic usage parameters of vehicle 130 such as distance of a trip, speeds traveled, and a trip duration relative to a vehicle location.

At step 710, process 700 may include controlling vehicle permissions based on a comparison of a vehicle location to one or more geo-fence boundaries. This comparison may be made according to calculated differences stored as part of one or more algorithms available in server programs 244 and/or controller programs 344. One or more processors 320 may modify at least one vehicle permission or disable a vehicle operation when the vehicle location, according to vehicle location data 352, is outside the geo-fence boundary. Vehicle permissions may be modified to disable a vehicle 130 entirely or may restrict particular vehicle functions, including access to a passenger compartment, use of entertainment system, or access to the trunk. Vehicle permissions may also be expanded if a comparison indicates the authorized vehicle user has driven only within a current or predetermined geo-fence boundary. A single permission may correlate with a single geo-fence boundary, or multiple permissions may correlate with a single geo-fence boundary. Other permission modifications are contemplated.

At step 712, process 700 may include displaying the map and the geo-fence boundary in accordance with the controlling of vehicle permission settings. The map may be displayed as a GUI as part of a software application executed in a personal device 120 and/or a GUI of vehicle 130. Vehicle location data 352 may be received in a cloud platform 190. Geo-fence information 356 from personal device 120 may be acquired, received, and stored in database 180, memory 340, or database 360. Geo-fence information 356 may be transmitted or sent as the result of instructions provided by network server 160 according to vehicle location data 352 or map data 354. In some embodiments, personal device 120 may transmit map data 354 or geo-fence information 356 automatically or periodically to cloud platform 190, without any request. A plurality of maps and associated geo-fence boundaries may be received in cloud platform 190 and displayed at one or more personal devices 120 and/or vehicle 130. Display may correlate with recent permission setting modifications. Other displaying methods may be contemplated.

The geo-fence boundary determined in step 706 may be updated automatically/periodically or upon user instructions. For example, the boundary may be updated when the origin changes. Vehicle permission settings in step 710 may be updated accordingly.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for controlling vehicle permissions based on a geo-fence boundary, the system comprising:
   a display;
   one or more processors configured to:
   receive location information of an origin;
   receive landmark features information of a map including major streets and smaller streets;
   receive zoom level information of the map;
   detect a number of user interactions with the display;
   determine a prospective radius from the origin based on the number of user interactions with the display;
   generate the map based on the location information of the origin, the landmark features, and the zoom level information of the map;
   automatically determine the geo-fence boundary according to the prospective radius from the origin based on the map, including:
      if the zoom level information indicates a first zoom level, generating the geo-fence boundary to be bounded by major streets, and
      if the zoom level information indicates a second zoom level, generating the geo-fence boundary to be bounded by smaller streets;
   receive a vehicle location;
   control the vehicle permissions based on a comparison of the vehicle location to the geo-fence boundary; and
   wherein the display is configured to display the map and the geo-fence boundary.

2. The system of claim 1, wherein the map is centered about the origin.

3. The system of claim 1, wherein the user input draws a boundary on the map around the origin, and wherein the one or more processors are further configured to determine the geo-fence boundary by modifying the boundary according to landmark features in the map.

4. The system of claim 1, wherein the user input paints a shape on the map around the origin, and wherein the one or more processors are further configured to determine the geo-fence boundary by modifying the shape according to landmark features in the map.

5. The system of claim 1, wherein detecting the number of user interactions with the display includes detecting a second user interaction, and the one or more processors are further configured to determine a second geo-fence boundary around the origin based on the second user interaction, and wherein the second geo-fence boundary embraces the first geo-fence boundary.

6. The system of claim 3, wherein the landmark features include at least one of city boundaries, county boundaries, or state boundaries.

7. The system of claim 1, wherein the one or more processors are further configured to modify at least one vehicle permission when the vehicle location is outside the geo-fence boundary.

8. The system of claim 7, wherein to modify the at least one vehicle permission includes to disable a vehicle operation.

9. A method for controlling vehicle permissions based on a geo-fence boundary, the method comprising:
   receiving location information of an origin;
   receiving landmark features information of a map including major streets and smaller streets;
   receiving zoom level information of the map;
   detecting a number of user interactions with a display;
   determining a prospective radius from the origin based on the number of user interactions with the display;
   generating, by one or more processor, the map based on the location information of the origin, the landmark features, and the zoom level information of the map;
   automatically determining, by the one or more processor, the geo-fence boundary according to the prospective radius from the origin based on the map, including:
      if the zoom level information indicates a first zoom level, generating the geo-fence boundary to be bounded by major streets, and
      if the zoom level information indicates a second zoom level, generating the geo-fence boundary to be bounded by smaller streets;
   receiving a vehicle location;
   controlling the vehicle permissions based on a comparison of the vehicle location to the geo-fence boundary; and
   displaying the map and the geo-fence boundary.

10. The method of claim 9, wherein the map is centered about the origin.

11. The method of claim 9, wherein the user input draws a boundary on the map around the origin, and wherein the one or more processors are further configured to determine the geo-fence boundary by modifying the boundary according to landmark features in the map.

12. The method of claim 9, wherein the user input paints a shape on the map around the origin, and wherein the one or more processors are further configured to determine the geo-fence boundary by modifying the shape according to landmark features in the map.

13. The method of claim 9, wherein detecting a number of user interactions with a display further comprises:
    detecting a second user interaction; and
    determining a second geo-fence boundary around the origin based on the second user interaction, and wherein the second geo-fence boundary embraces the first geo-fence boundary.

14. A non-transitory computer-readable medium storing instructions executable by one or more processors to perform a method for controlling vehicle permissions based on a geo-fence boundary, the method comprising:
    receiving location information of an origin;
    receiving landmark features information of a map including major streets and smaller streets;
    receiving zoom level information of the map;
    detecting a number of user interactions with a display;
    determining a prospective radius from the origin based on the number of user interactions with the display;
    generating, by one or more processor, the map based on the location information of the origin, the landmark features, and the zoom level information of the map;
    automatically determining, by the one or more processor, the geo-fence boundary according to the prospective radius from the origin based on the map, including:
       if the zoom level information indicates a first zoom level, generating the geo-fence boundary to be bounded by major streets, and
       if the zoom level information indicates a second zoom level, generating the geo-fence boundary to be bounded by smaller streets;
    receiving a vehicle location;
    controlling the vehicle permissions based on a comparison of the vehicle location to the geo-fence boundary; and
    displaying the map and the geo-fence boundary.

* * * * *